United States Patent
Gao et al.

(10) Patent No.: US 9,060,377 B2
(45) Date of Patent: Jun. 16, 2015

(54) ABS-BASED METHOD FOR INTER CELL INTERFERENCE COORDINATION IN LTE-ADVANCED NETWORKS

(75) Inventors: Long Gao, Santa Clara, CA (US); Joydeep Acharya, Sunnyvale, CA (US); Sudhanshu Gaur, Santa Clara, CA (US)

(73) Assignee: HITACHI, LTD., Tokyo (JP)

( * ) Notice: Subject to any disclaimer, the term of this patent is extended or adjusted under 35 U.S.C. 154(b) by 164 days.

(21) Appl. No.: 13/287,923

(22) Filed: Nov. 2, 2011

(65) Prior Publication Data

US 2013/0107798 A1   May 2, 2013

(51) Int. Cl.
*H04Q 7/00* (2006.01)
*H04W 72/12* (2009.01)
*H04W 92/20* (2009.01)

(52) U.S. Cl.
CPC .......... *H04W 72/1226* (2013.01); *H04W 92/20* (2013.01)

(58) Field of Classification Search
USPC ....................................................... 455/63.1
See application file for complete search history.

(56) References Cited

U.S. PATENT DOCUMENTS

| | | |
|---|---|---|
| 2009/0252077 A1 | 10/2009 | Khandekar et al. |
| 2009/0296641 A1 | 12/2009 | Bienas et al. |
| 2010/0111013 A1 | 5/2010 | Chou |
| 2010/0136996 A1 | 6/2010 | Han et al. |
| 2010/0195582 A1 | 8/2010 | Koskinen |
| 2010/0246515 A1 | 9/2010 | Tsai et al. |
| 2010/0303013 A1 | 12/2010 | Khandekar et al. |
| 2011/0116437 A1 | 5/2011 | Chen et al. |
| 2011/0149894 A1 | 6/2011 | Luo et al. |
| 2011/0159882 A1 | 6/2011 | Ho et al. |
| 2011/0249611 A1 | 10/2011 | Khandekar et al. |
| 2011/0249642 A1 | 10/2011 | Song et al. |
| 2012/0082052 A1* | 4/2012 | Oteri et al. ............. 370/252 |
| 2012/0113843 A1* | 5/2012 | Watfa et al. ............ 370/252 |
| 2013/0017793 A1* | 1/2013 | Henttonen et al. ..... 455/63.1 |
| 2013/0084865 A1* | 4/2013 | Agrawal et al. ........ 455/436 |
| 2013/0229971 A1* | 9/2013 | Siomina et al. ........ 370/312 |

OTHER PUBLICATIONS

3GPP TS36.300 v. 10.5.0 Available online: http://www.3gpp.org/FTP/Specs/html-info/36300.htm, Oct. 3, 2011.
3GPP TS36.304 v. 10.3.0 Available online: http://www.3gpp.org/ftp/Specs/html-info/36304.htm, Oct. 3, 2011.
3GPP TS36.331 v. 10.3.0 Available online: ftp://ftp.3gpp.org/specs/html-info/36331.htm, Sep. 30, 2011.

* cited by examiner

*Primary Examiner* — Duc C Ho
(74) *Attorney, Agent, or Firm* — Procopio, Cory, Hargreaves & Savitch LLP

(57) ABSTRACT

The Long Term Evolution Advanced (LTE-A) network, is a heterogeneous network, where macro and pico base stations (BSs) coexist to improve spectral efficiency per unit area. Systems and methods described herein attempt to provide a solution to the interference coordination problem between macro BSs and pico user equipments (UEs). Specifically, the systems and methods conduct interference coordination based on the concept of almost blank subframe (ABS), which is supported by the LTE-A standard. The macro BSs choose their ABS configurations in a cooperative way such that the overall system throughput is optimized.

19 Claims, 13 Drawing Sheets

ABS-BASED METHOD FOR INTER CELL INTERFERENCE COORDINATION IN LTE-ADVANCED NETWORKS

BACKGROUND

The Long Term Evolution-Advanced (LTE-A) network is designed to improve the spectral efficiency by reducing the cell size through utilizing a heterogeneous deployment of a diverse set of base stations (BSs). FIG. 1 illustrates an exemplary heterogeneous cellular network, where the macro 100 and pico 101 BSs coexist to serve user equipments (UEs) 102 in the area. The macro BSs are deployed in a regular and planned manner with high transmit power (the typical value is 46 dBm to cover a macro cell 103) and the overlaid pico BSs are deployed in areas with poor coverage (e.g., providing a pico cell 104 to cover the edge of a macro cell) with relatively low transmit power (the typical value is 30 dBm). Such an overlaid BS deployment can improve the coverage and provide capacity gain by increasing spatial reuse of the spectrum.

When a user equipment (UE) is turned on, it searches for a suitable cell (which could either be a macro or pico cell in a heterogeneous cellular network) with which to associate. To determine which cell to select, a UE measures the reference signals (RSs) from the BSs in its surrounding area. Based on the reference signal received power (RSRP), the UE associates itself to the BS with the maximum RSRP.

FIG. 2 illustrates an example of a UE measuring reference signals from a macro BS and a pico BS. A UE 200 measures the reference signals RS1 and RS2 from the macro BS 201 and pico BS 202, respectively. When the RSRP of RS1 is greater than that of RS2, the UE 200 associates itself to the macro BS as shown at 203. The UE 200 undergoes a cell selection process periodically. In a subsequent period, if the RSRP of RS1 is less than that of RS2, the UE 200 will choose the pico cell 202 as its serving cell instead. Note that a UE 200 reports measurement information periodically to its associated cell, which includes the RSRP values for the other BSs in its neighborhood. Such information will be used for future cell selection.

In a heterogeneous network, the pico UEs that are served by the pico BSs suffer severe interference from the macro BSs due to their high transmit powers. In order to reduce the interference to the pico UEs, the macro BSs can mute certain subframes, which are called almost blank subframes (ABSs). In an Almost Blank Subframe (ABS), most resource elements (REs) are blank and only a small amount of REs carry some system information (e.g., cell-specific RSs and synchronization signals). The pico UEs can achieve a higher data rate when the macro BSs transmit ABSs due to the reduced interference level from the muted subframes.

FIG. 3 illustrates an exemplary LTE-A frame. The LTE-A frame 300 can be divided into subframes 301. An LTE-A frame typically contains 10 subframes that are indexed from 0 to 9. For the ABS configuration with the macro BSs, subframes 1, 2, 7, and 8 are configured as ABS in this example. Note that the ABS pattern configured by one BS can be indicated to neighboring BSs via an X2 interface in the LTE-A network. Based on the ABS pattern configured by the macro BSs, the pico BSs transmit data packets to their cell-edge UEs in subframes 1, 2, 7, and 8 and serve their cell-center UEs in the rest of the subframes, such that the overall throughput of the pico UEs (especially the cell-edge UE throughput) is improved.

SUMMARY OF THE INVENTION

Aspects of the exemplary embodiments include a macro base station, which involves an X2 interface module that transmits a request for adjusting subframes based on a number of victim user equipments (UEs); and an almost blank subframe (ABS) configuration module that selects subframes to mute. The X2 interface module transmits information regarding the selected muted subframes.

Additional aspects of the exemplary embodiments include a method, which involves transmitting a request for adjusting subframes based on a number of victim user equipments (UEs); selecting subframes to mute; and transmitting information regarding the selected muted subframes.

Additional aspects of the exemplary embodiments include a macro base station, which involves an almost blank subframe (ABS) configuration module that selects initial subframes to mute based on a report of a number of victim user equipments (UEs).

BRIEF DESCRIPTION OF THE DRAWINGS

These, and or/other aspects will become more readily appreciated from the following description of the embodiments, taken in conjunction with the accompanying drawings, in which.

DETAILED DESCRIPTION OF THE INVENTION

ABSs can be configured by the macro BSs to reduce the interference to the pico UEs and thus improve their throughput performance in a LTE-A network. The throughput of the pico UEs increases with a larger number of ABSs configured in each frame. However, increasing the number of ABSs in a frame will reduce the available subframes for the macro UEs and thus decrease their throughput. Therefore, exemplary embodiments attempt to choose appropriate ABS ratios for the macro BSs, which is defined as the number of ABSs over the total number of subframes in a frame, such that the throughputs of macro and pico UEs are well balanced and the overall system throughput is optimized.

Figure 1:
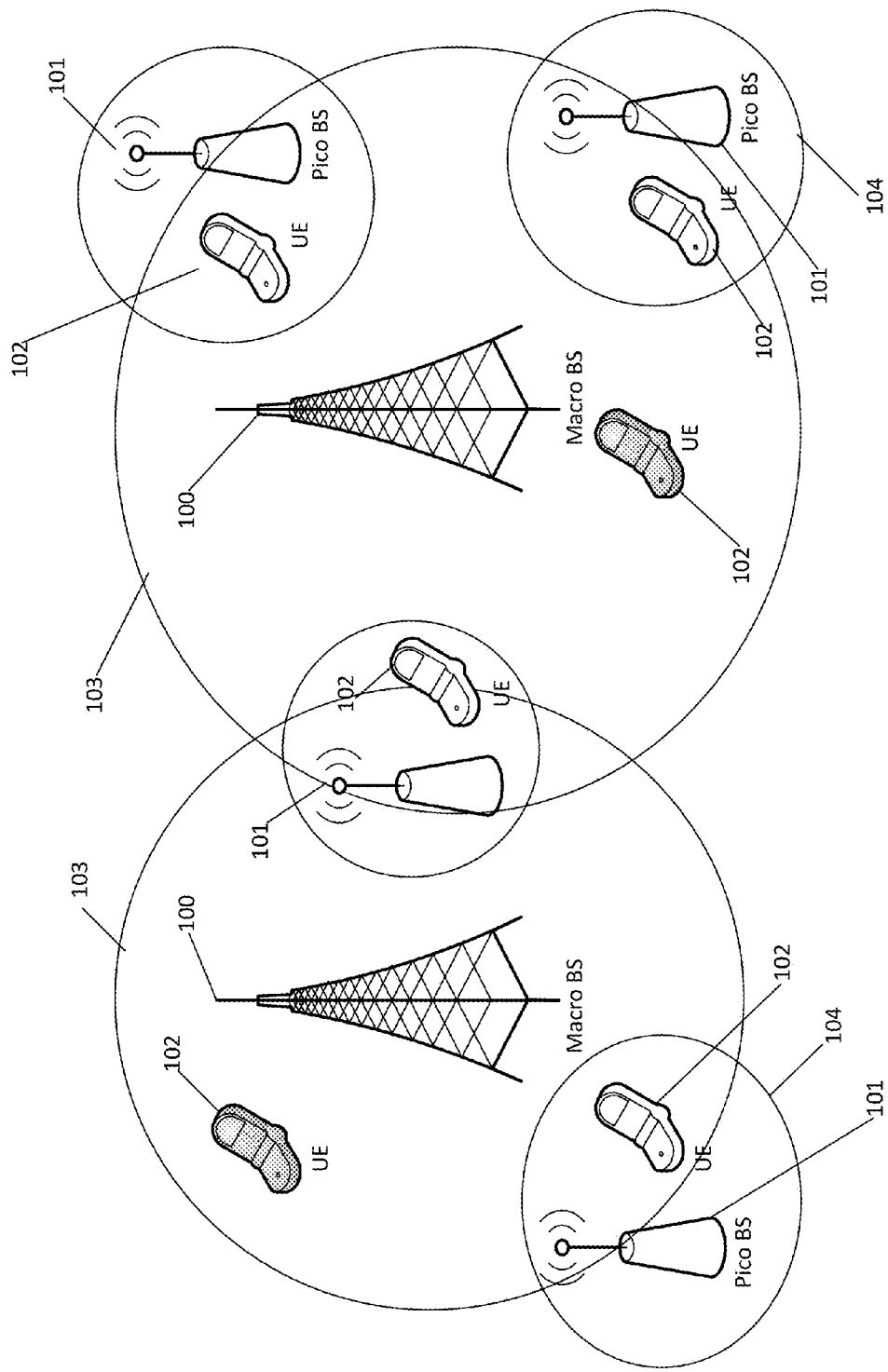
FIG. 1 illustrates an exemplary heterogeneous cellular network.
Figure 2:
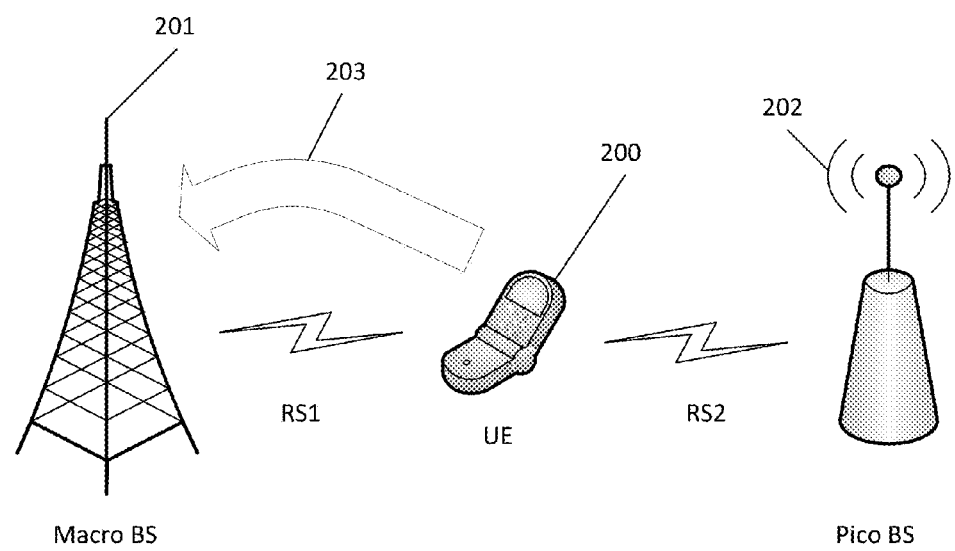
FIG. 2 illustrates an example of a UE measuring reference signals from a macro BS and a pico BS.
Figure 3:
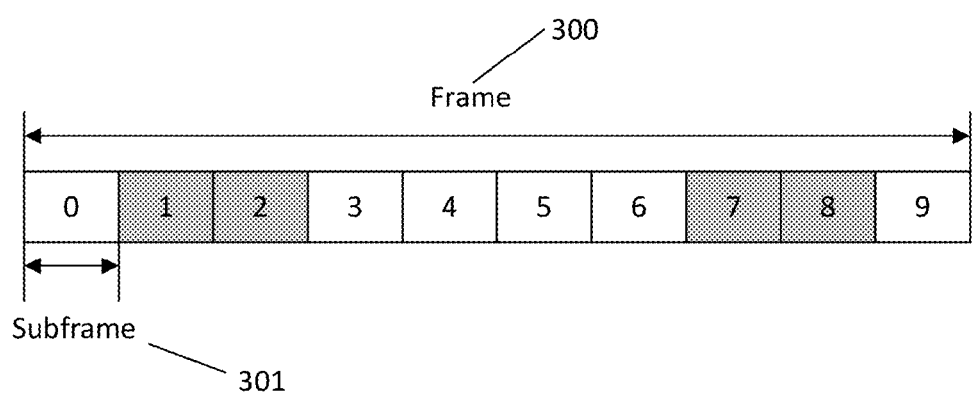
FIG. 3 illustrates an exemplary LTE-A frame.
Figure 4:
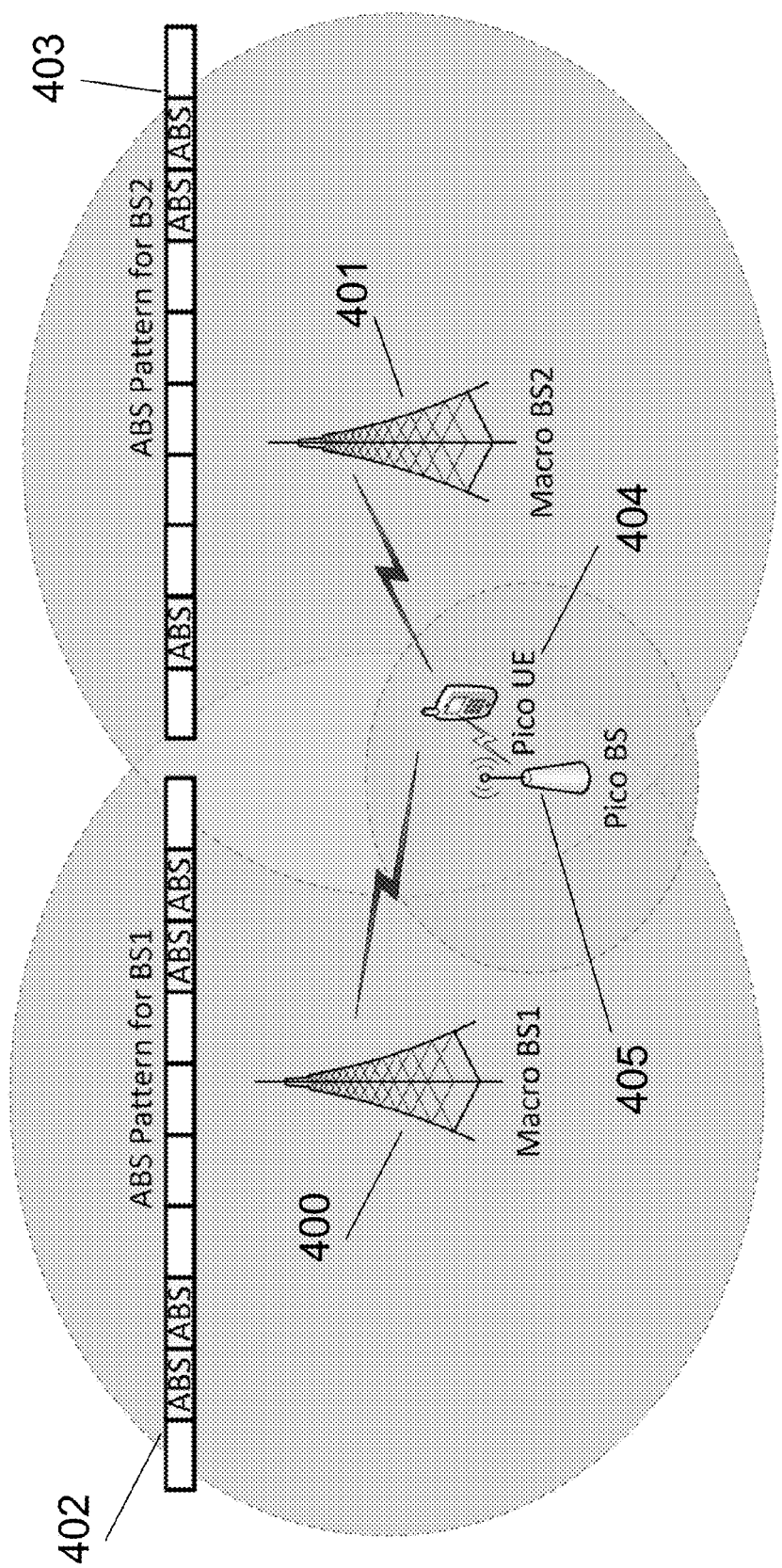
FIG. 4 illustrates an example of a pico UE subjected to two strong interference sources.

Besides the ABS ratio, the ABS pattern (i.e., the positions or subframe indices of the ABSs in each frame) is also considered to coordinate the interference from the macro BSs to the pico UEs. FIG. 4 illustrates a scenario where a pico UE 404 associated with a pico base station (BS) 405 has two strong interference sources: macro BS1 400 and macro BS2 401. In this example, the two macro BSs 400 and 401 have different ABS ratios, thereby requiring them to configure their ABS patterns such that the positions of the ABSs are aligned with each other, as shown at 402 and 403. Note that given the channel measurement and feedback limitations of the UEs, the two macro BSs may be configured to have the same ABS ratios and patterns such that the interferences from the two macro BSs are perfectly aligned together.

The exemplary embodiments attempt to provide ABS-based interference coordination that satisfies the following two conditions: having good balance between the throughput of the macro UEs and that of the pico UEs and ensuring that the macro BSs that interfere with the same group of the pico UEs utilize the same or at least an aligned ABS pattern.

Figure 5:
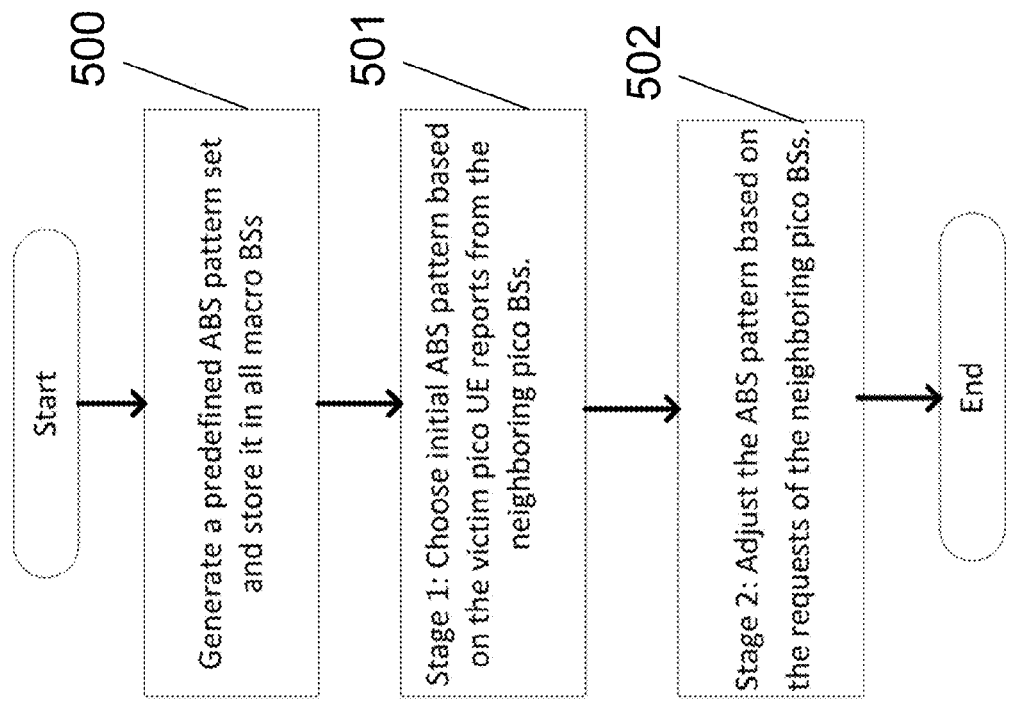
FIG. 5 illustrates a flowchart for coordinating the ABSs to handle interference, in accordance with an exemplary embodiment.

The exemplary embodiments described herein are directed to coordinate the interference from the macro BSs to the pico UEs in a LTE-A network. FIG. 5 illustrates a flowchart for coordinating the ABSs to handle interference, in accordance with an exemplary embodiment. A predefined ABS pattern set is generated and stored in macro BSs in the beginning 500. Each macro BS configures its ABS pattern into two stages.

In the first stage 501, an initial ABS pattern is chosen based on the victim pico UE reports from the neighboring pico BSs.

In the second stage 502, the ABS pattern is adjusted based on the request of the pico BSs.

The victim pico UE of a macro BS is defined as the pico UE that receives interference from the macro BS, such that the interference level (measured by the RSRP) of the link (from the macro BS to the pico UE) is above a predefined threshold.

Figure 6:
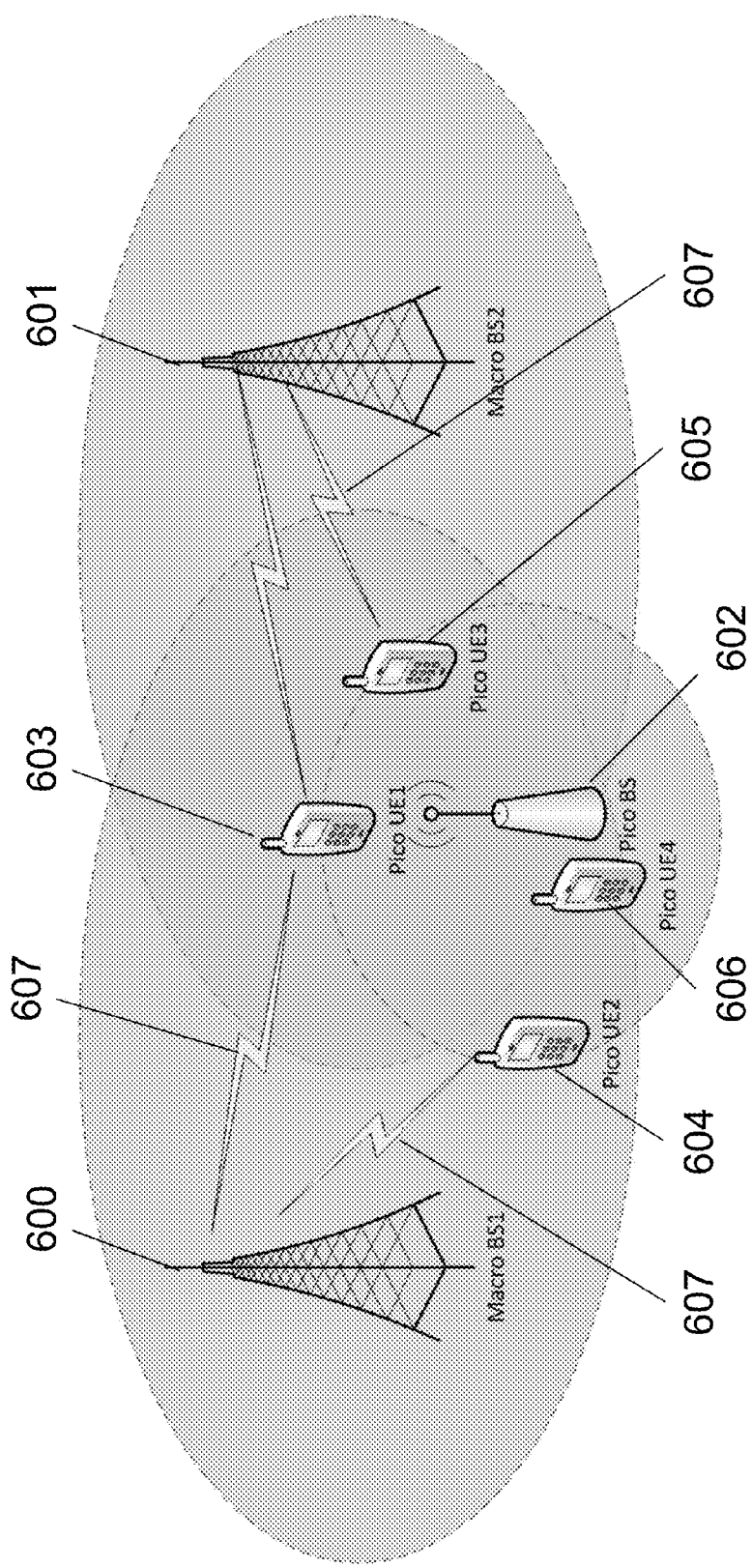
FIG. 6 illustrates an example of victim pico UEs receiving interference from a macro BS.

FIG. 6 illustrates an example of victim pico UEs receiving interference from a macro BS. There are four pico UEs 603, 604, 605 and 606 associated with pico BS 602 that suffer interference from two macro BSs (macro BS1 600 and macro BS2 601). In this example the strong interference links 607 (whose RSRP values are above a predefined threshold TI) are shown. In this example, pico UE1 603 and pico UE2 604 are two victim UEs for macro BS1 600 since the interference levels from the macro BS for the two interference links are above a threshold TI. Similarly, pico UE1 603 and pico UE3 605 are two victim UEs for macro BS2 601. Furthermore, pico UE1 603 is the common victim UE for macro BS1 600 and macro BS2 601. The non-victim UEs for macro BS1 600 are pico UE3 605 and pico UE4 606, while the non-victim UEs for macro BS2 601 are pico UE2 604 and pico UE4 606.

Hardware Configuration in Accordance with Exemplary Embodiments

Figure 7:
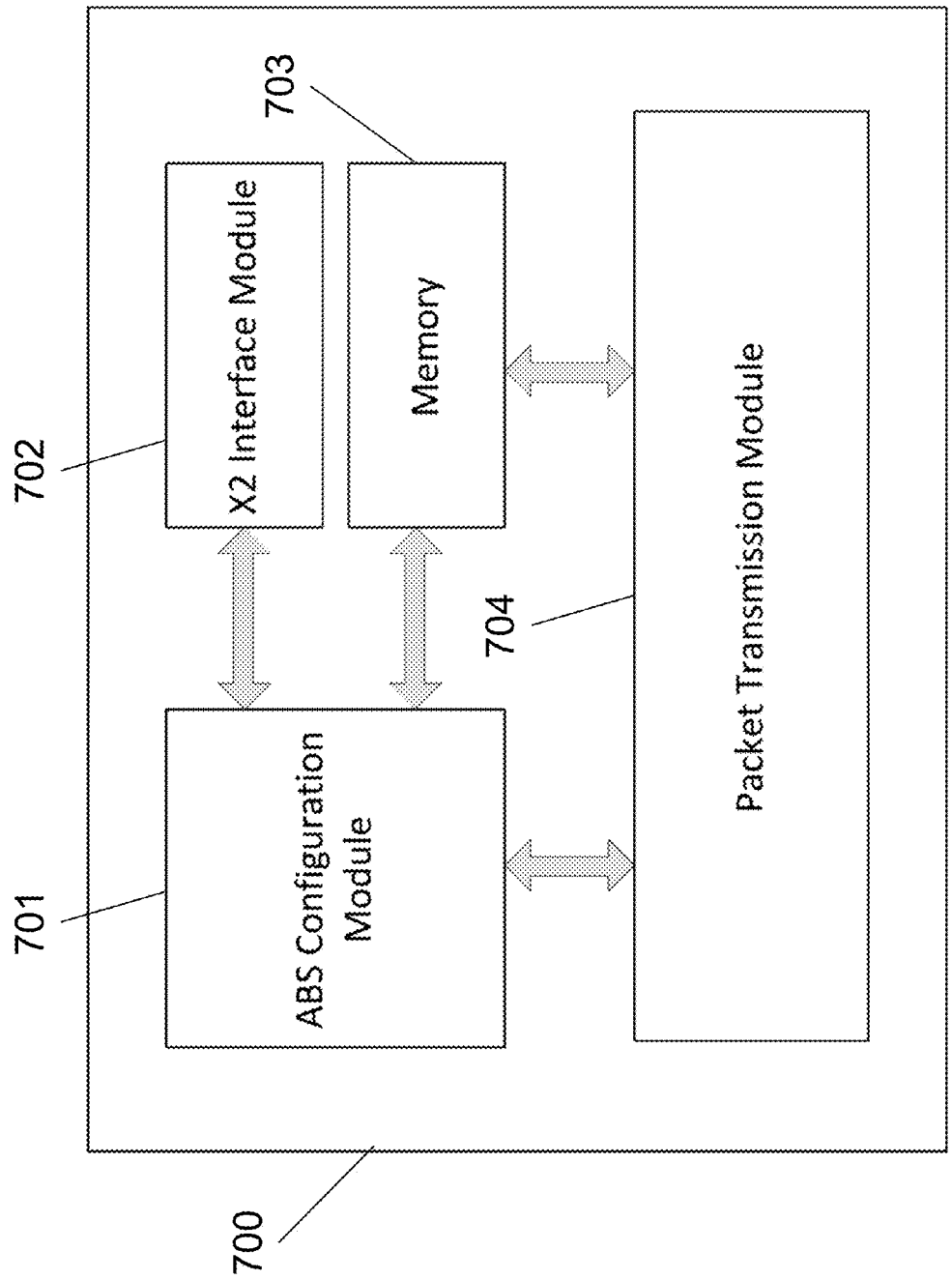
FIG. 7 illustrates a block diagram of a macro base station in accordance with an exemplary embodiment.

FIG. 7 illustrates a block diagram of a macro base station in accordance with an exemplary embodiment. The macro BS 700 utilizes several modules. The ABS configuration module 701 handles processing related to configuring the ABS pattern or muting specific subframes. The X2 interface module 702 handles communication exchanges and protocols when the macro BS 700 exchanges information with other macro and pico BSs. The memory 703 stores predefined ABS pattern sets. The packet transmission module 704 handles the transmission of packets to macro UEs according to the ABS configuration determined by the ABS configuration module 701. The modules may be implemented on one or more processors.

Figure 8:
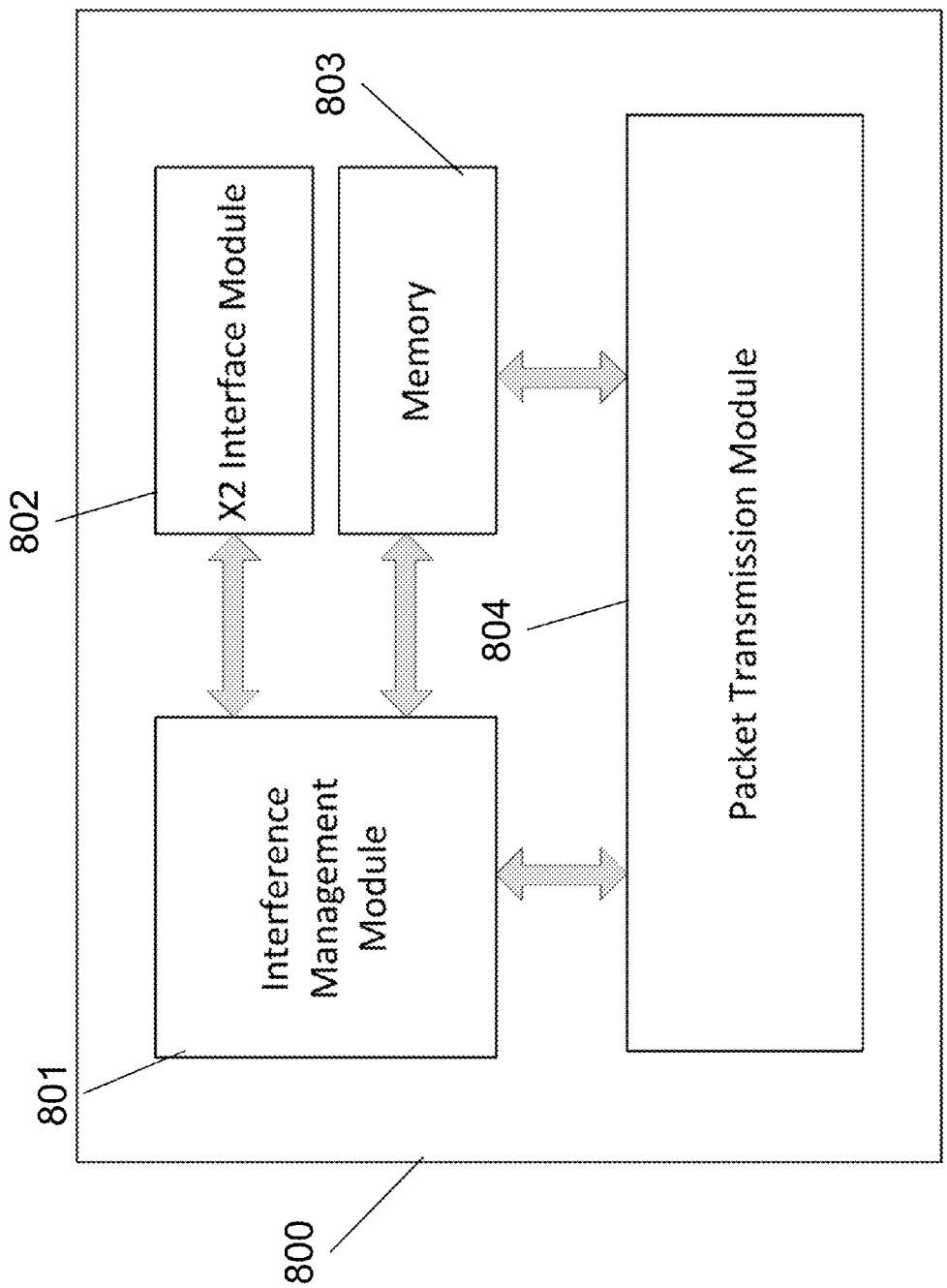
FIG. 8 illustrates a block diagram of a pico base station in accordance with an exemplary embodiment.

FIG. 8 illustrates a block diagram of a pico BS in accordance with an exemplary embodiment. The pico BS 800 utilizes several modules. The interference management module 801 handles processing regarding the level of interference for victim UEs associated with the pico BS, including determining if the interference is beyond a predetermined threshold and identifying the sources of the interference. The X2 interface module 802 handles communication exchanges and protocols when the pico BS 800 exchanges information with other macro and pico BSs. The memory 803 stores the table of the victim UE IDs and their associations with neighboring macro BSs. The packet transmission module 804 handles the transmission of packets to and from the pico UEs according to the ABS patterns of the corresponding neighboring macro BSs.

Figure 9:
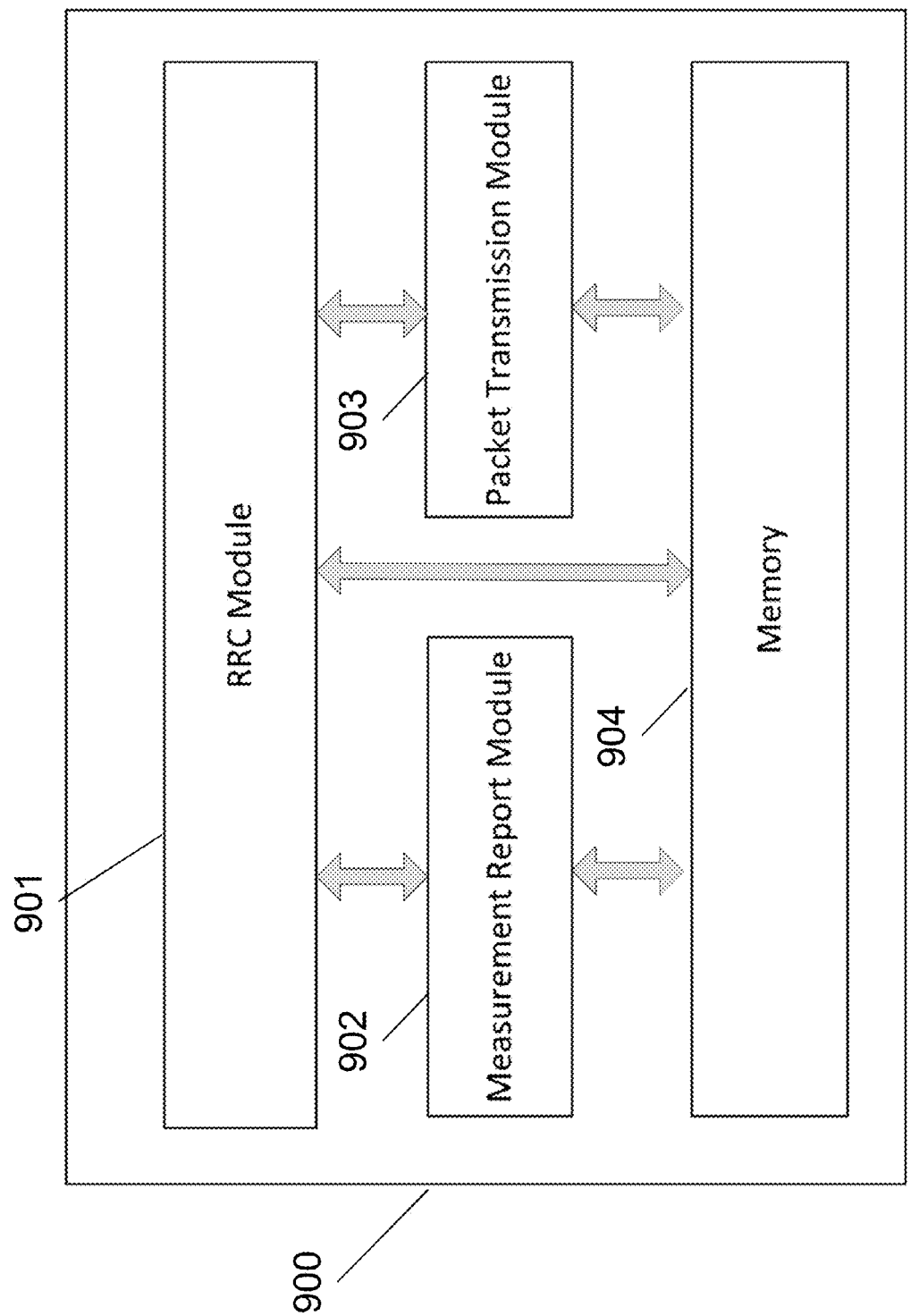
FIG. 9 illustrates a block diagram of a user equipment in accordance with an exemplary embodiment.

FIG. 9 illustrates a block diagram for a user equipment in accordance with an exemplary embodiment. The UE 900 utilizes several modules. The radio resource control (RRC) module 901 is utilized to measure the RSRP values from the BSs (including macro BSs and pico BSs) in the neighborhood of the UE and for performing UE association. The measurement report module 902 reports the RSRP values to the corresponding associated BS (which could be either a macro BS or pico BS) of the UE. The packet transmission module 903 handles receipt of packets from the corresponding associated BS of the UE. The memory 904 stores data for the measurement report module 902 (e.g., the RSRP values from the RRC module) and the packet transmission module 903.

Exemplary Implementations

In exemplary embodiments, a predefined set of several ABS patterns is generated and then stored in all of the macro BSs, with each of the ABS patterns corresponding to a particular ABS ratio. Note that in the predefined ABS pattern set, each ABS ratio has one and only one fixed pattern. An example of an ABS pattern set is given in Table I, where the set has 7 ABS patterns corresponding to the ABS ratios from 0 to 60%.

TABLE I

An example of a predefined ABS pattern set

| ABS Ratio | ABS Pattern (the subframe indices of the ABSs in a frame) |
|---|---|
| 60% | 1 2 3 6 7 8 |
| 50% | 1 2 6 7 8 |
| 40% | 1 2 7 8 |
| 30% | 1 7 8 |
| 20% | 1 8 |
| 10% | 1 |
| 0% | None |

Each pico BS maintains a table which lists the victim pico UE IDs for each of its neighboring macro BSs. For the example shown in FIG. 6 above, TABLE II shows the table containing victim pico UE IDs for the two macro BSs, where the RSRP values are given just for illustration purposes and the threshold for the victim UE is set to 10 as an example.

TABLE II

An example of the table maintained at a pico BS

| UE ID | Cell ID | RSRP | Victim UE (Yes/No) |
|---|---|---|---|
| Pico UE1 | Macro BS1 | 15 | Yes |
| | Macro BS2 | 14 | Yes |
| Pico UE2 | Macro BS1 | 17 | Yes |
| | Macro BS2 | 6 | No |
| Pico UE3 | Macro BS1 | 5 | No |
| | Macro BS2 | 15 | Yes |
| Pico UE4 | Macro BS1 | 7 | No |
| | Macro BS2 | 6 | No |

The macro BSs determine their ABS patterns periodically and in a synchronized way. In each period, each macro BS figures out which ABS pattern from the predefined pattern set should be used in two stages.

Figure 10:
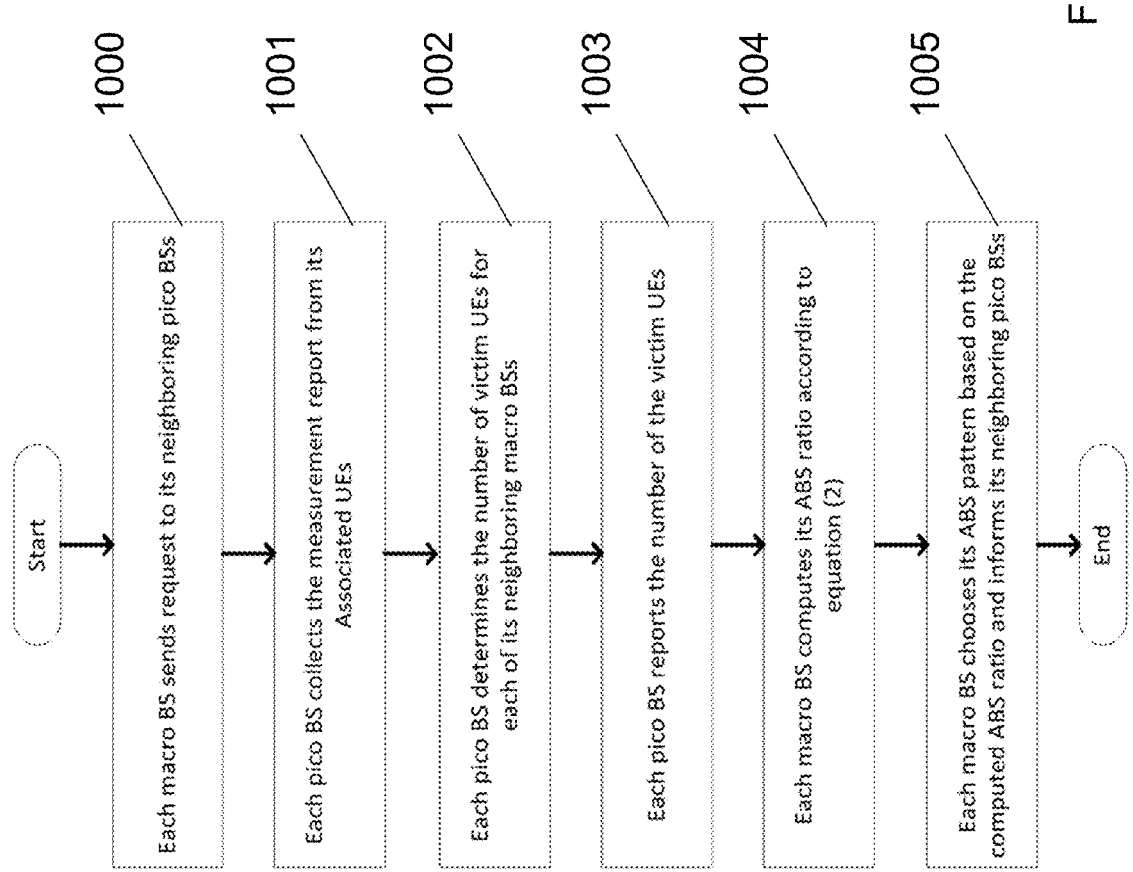
FIG. 10 illustrates a flowchart of the first stage in accordance with an exemplary embodiment.

FIG. 10 illustrates a flowchart of the first stage in accordance with exemplary embodiments. Reference will be made to elements from FIGS. 7-9.

At 1001 of the first stage, each macro BS 700 chooses an initial ABS pattern from memory 703 based on the number of its associated UEs and the number of its victim UEs associated to its neighboring pico BSs. The initial ABS pattern may be chosen by an ABS configuration module 701 of the macro BS. By using an X2 Interface module 702 or other communication methods, the macro BS 700 sends requests to its neighboring pico BSs for the numbers of its victim pico UEs associated to those pico BSs. The pico BS 800 that receives the request from a macro BS 700 at an X2 interface module 802, will collect measurements from the associated UEs 900 as shown at 702. The pico BS may utilize an interference management module 801 to collect the measurement. The pico BS 800 reports the number of the victim UEs for the macro BS through the X2 interface module 802, based on the table stored in memory 803 that contains the victim UE IDs, as shown in TABLE II. After the macro BS receives the desired reports from the neighboring pico BSs, the ABS configuration module 701 will average the number of victim pico UEs $\overline{V}_k$ over its neighboring pico cells, which is given by $$\overline{V}_k = \frac{\sum_{m=1}^{N_k} V_k^m}{N_k} \quad (1)$$

where $N_k$ is the total number of the neighboring pico BSs for macro BS k and $V_k^m$ is the number of victim pico UEs reported from the m-th neighboring pico BSs. Note that the pico BSs may also derive the number of the victim UEs and report to the macro BS based on the measurement reports of their associated UEs. Let $A_k$ denotes the number of macro UEs associated to macro BS k. Macro BS k chooses the initial ABS pattern with the ABS ratio closest to $R_k$, which is given by $$R_k = \frac{\alpha_k \overline{V}_k}{A_k + \alpha_k \overline{V}_k} \quad (2)$$

where $\alpha_k \in (0,1]$ is a system parameter capturing the throughput balance between the macro and pico UEs and a higher value of $\alpha_k$ provides more throughput gain to pico UEs. Once the macro BS determines the appropriate ABS pattern, the macro BS informs the neighboring pico BSs of the ABS pattern.

Figure 11:
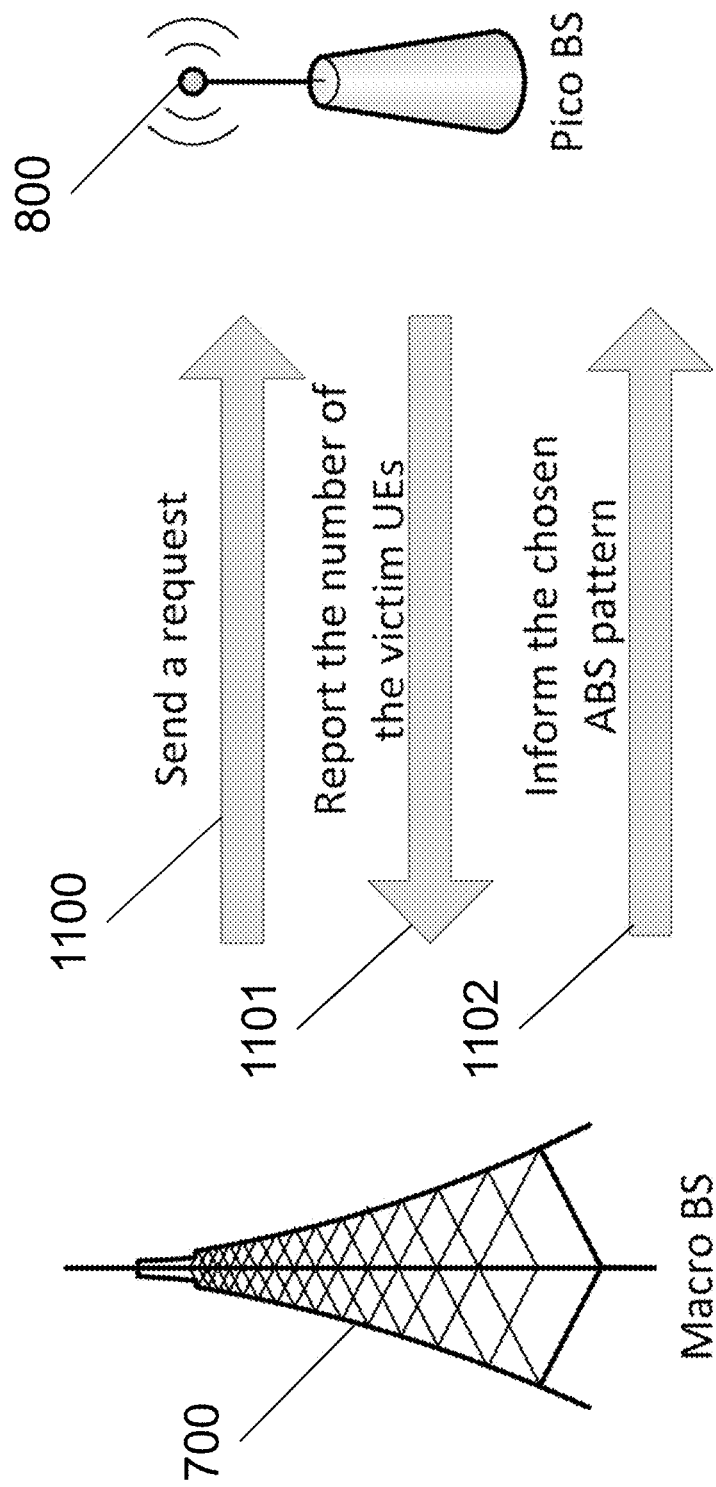
FIG. 11 illustrates the interaction between a macro BS and its neighboring pico BSs in the first stage, in accordance with an exemplary embodiment.

FIG. 11 illustrates an interaction between a macro BS and its neighboring pico BSs in the first stage, in accordance with an exemplary embodiment. At 1100 the macro BS 700 sends a request to the pico BS 800. At 1101, the pico BS 800 reports the number of victim UEs to the macro BS 700. At 1102, the macro BS 700 informs the pico BS 800 of the selected ABS pattern. The macro BS may select a pattern from memory or may individually select subframes to mute.

Figure 12:
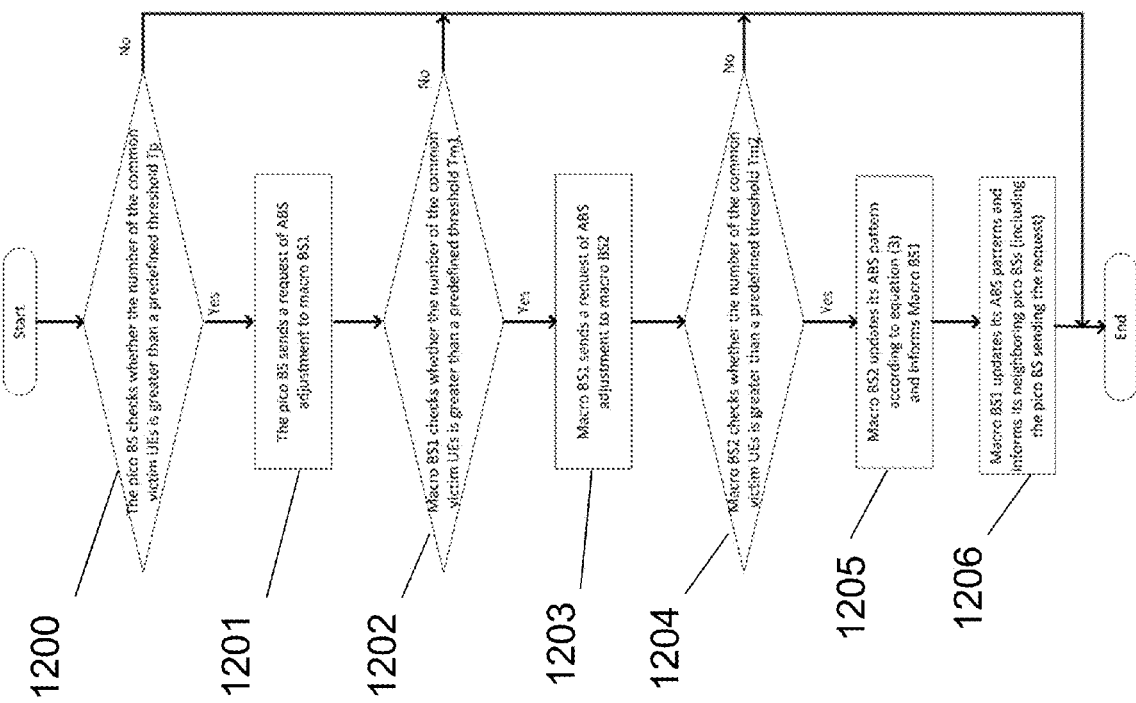
FIG. 12 illustrates a flowchart of the second stage in accordance with an exemplary embodiment.

FIG. 12 illustrates a flowchart of the second stage in accordance with exemplary embodiments. Reference will be made to elements from FIGS. 7-9. In the second stage, the macro BSs 700 adjust their ABS patterns obtained from the first stage based on the request of the pico BSs 800. The adjustment may be carried out by the ABS configuration module 701 of the respective BS. In the second stage, a pico BS 800 can initialize a process of the ABS pattern adjustment/alignment between two macro BSs with different ABS patterns.

At 1200, the pico BS 800 checks the number of the common victim UEs 900 for the macro BSs 700. In the example given in FIG. 6, there are two macro BSs 700 (macro BS1 and macro BS2) that transmit within the cell of the pico BS 800. The pico BS 800 may utilize an interface management module 801 to check the number of common victim UEs. The UEs 900 may generate a report to the pico BS 800 by utilizing a measurement report module 902, and report it to the pico BS 800 by using the packet transmission module 903.

At 1201, the pico BS 800 sends a request to one of the two macro BSs 700, (in this example, macro BS1), if the number of common victim UEs 900 is greater than a predefined threshold Tp. The request may be sent by the X2 interface module 802 of the pico BS 800 and received by the X2 interface module 702 of each macro BSs 700.

At 1202, the macro BS 700 (in this example, macro BS1) checks if the number of victim UEs 900 is greater than a predetermined threshold Tm1. The macro BS 700 may determine if the number exceeds the predetermined threshold by using the ABS configuration module 701.

At 1203, the macro BS 700 (in this example, macro BS1), transmits a request for ABS adjustment to the other interfering macro BS 700 (in this example, macro BS2), to request an ABS adjustment, if the number of common victim UEs 900 is determined to be greater than a predetermined threshold Tm1. The request may be sent through the X2 interface module 702.

At 1204, the other interfering macro BS 700 (in this example, macro BS2), determines whether the number of common victim UEs exceeds a threshold Tm2. The other interfering macro BS 700 may determine if the number exceeds the predetermined threshold by using the ABS configuration module 701.

At 1205, the other interfering macro BS 700 (in this example, macro BS2), updates its ABS pattern by using the ABS configuration module 701, and informs the requesting macro BS 700 (in this example, macro BS1) of the updated pattern by using the X2 interface module 702. The ABS pattern update may be conducted in accordance with equation (3).

At 1206, the requesting macro BS 700 (in this example, macro BS1) updates its ABS pattern based on the received updated pattern from the X2 interface module 702. The macro BS 700 may inform neighboring pico BSs 800 (including the original pico BS sending the request) of the updated ABS pattern by using the X2 interface module 702.

Figure 13:
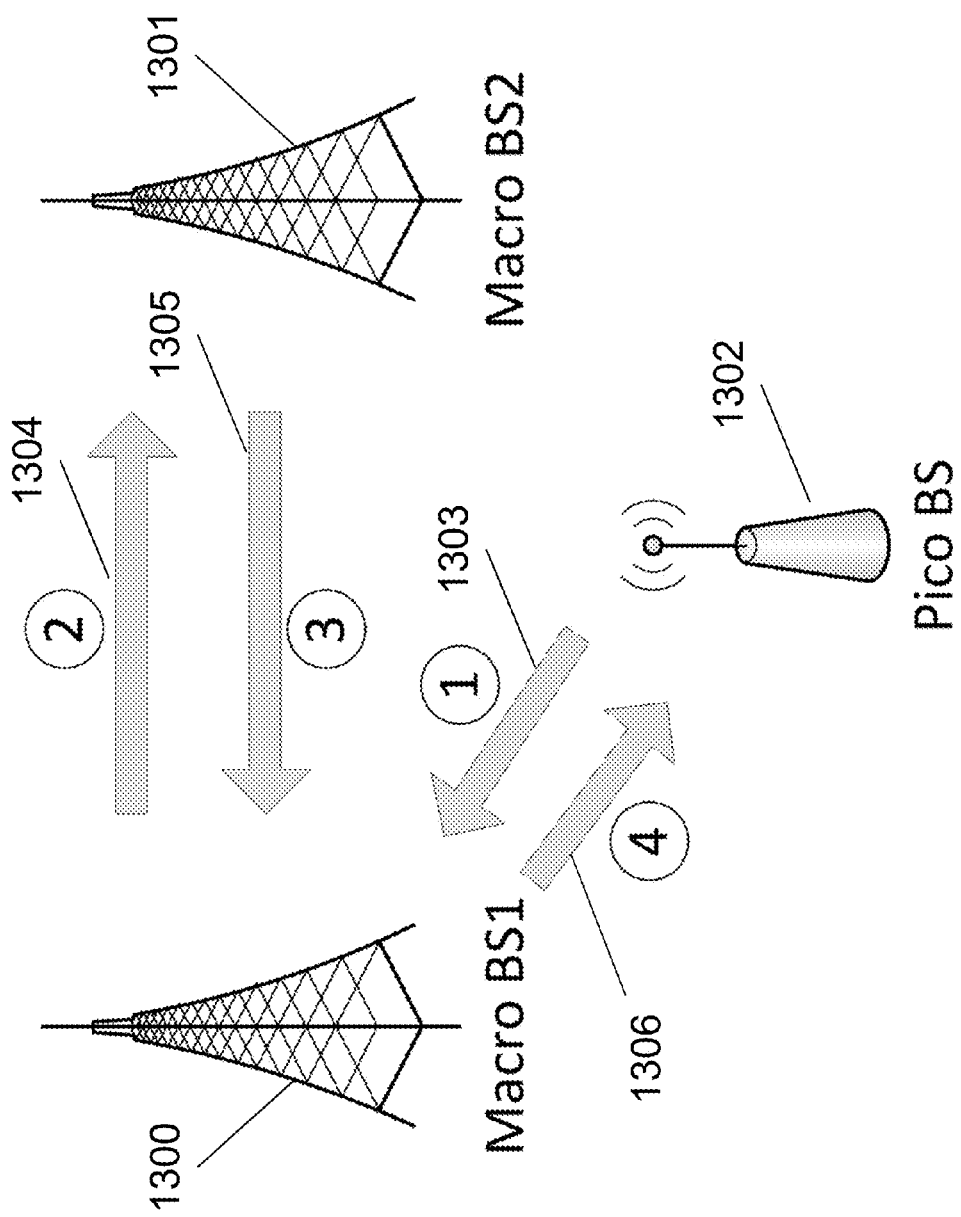
FIG. 13 illustrates an interaction between a pico BS and two macro BSs in the second stage, in accordance with an exemplary embodiment.

FIG. 13 illustrates an interaction between a pico BS and two macro BSs in the second stage, in accordance with an exemplary embodiment. At 1303, the pico BS 1302 checks the number of the common victim UEs for the two macro BSs (denoted as macro BS1 1300 and BS2 1301) within its cell. If the number is greater than a predefined threshold Tp, the pico BS 1302 sends a request to one of the two macro BSs, e.g., macro BS1 1300. The request message includes the cell IDs of the two macro BSs whose ABS patterns need to be adjusted, and the number of the common victim UEs.

After macro BS1 1300 receives the request from the pico BS 1302 as shown at 1304, the pico BS 1302 checks whether the number of the common victim UEs (obtained from the request message sent by the pico BS 1302) is greater than a predefined threshold Tm1. If so, the pico BS 1302 sends a request to the other macro BS, i.e., macro BS2 1301 for ABS adjustment. The request message includes the number of macro UEs associated with it $A_1$, the average number of its victim UEs, i.e., $\overline{V}_1$ given in (1), and the number of the common victim UEs for the two macro BSs (obtained from the request message from the pico BS).

After macro BS2 1301 receives the request from macro BS1 1300 as shown at 1305, macro BS2 1301 checks whether the number of the common victim UEs (obtained from the request message sent by macro BS1) is greater than a predefined threshold Tm2. If so, macro BS1 1300 changes its ABS pattern to the one with the ABS ratio closest to $R'_2$, which can be calculated by $$R'_2 = \frac{\alpha_2(\overline{V}_1 + \overline{V}_2)}{A_1 + A_2 + \alpha_2(\overline{V}_1 + \overline{V}_2)} \quad (3)$$

After macro BS2 1301 determines the new ABS pattern, macro BS2 1301 informs macro BS1 1300 of the new configured BS pattern by sending a confirmation message.

Once macro BS1 1300 receives the confirmation message from macro BS2 1301, macro BS1 1300 informs the pico BS 1302 about the new ABS pattern as shown at 1306 and changes its ABS pattern accordingly.

Some portions of the detailed description are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result.

Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The exemplary embodiments may also relate to an apparatus for performing the operations herein. This apparatus may be specially constructed for the required purposes, or it may include one or more general-purpose computers selectively activated or reconfigured by one or more computer programs. Such computer programs may be stored in a computer-readable storage medium, such as, but not limited to optical disks, magnetic disks, read-only memories, random access memories, solid state devices and drives, or any other types of media suitable for storing electronic information.

The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the invention will be apparent to those skilled in the art from consideration of the specification and practice of the invention disclosed herein. Various aspects and/or components of the described embodiments may be used singly or in any combination. It is intended that the specification and examples be considered as exemplary only, with a true scope and spirit of the invention being indicated by the following claims.

What is claimed is:

1. A base station, comprising:
an X2 interface module configured to transmit one or more requests to one or more first base stations for reporting a number of victim user equipments (UEs);
a memory configured to store one or more reports indicative of the number of victim UEs;
an almost blank subframe (ABS) configuration module that selects subframes to mute based on the number of victim UEs;
wherein the X2 interface module transmits information regarding the selected muted sub frames to one or more second base stations;
wherein the X2 interface module transmits a request for adjusting subframes upon receiving a request for ABS adjustment.

2. The base station of claim 1, wherein the ABS configuration module selects subframes to mute by selecting an ABS pattern from a plurality of ABS patterns based on the one or more reports.

3. The base station of claim 1, wherein the X2 interface module receives information regarding subframes to mute and wherein the ABS configuration module selects subframes to mute according to the information regarding subframes to mute.

4. The base station of claim 3, wherein the information regarding subframes to mute comprises an updated ABS pattern, and wherein the ABS configuration module selects subframes to mute by selecting the updated ABS pattern from a plurality of ABS patterns.

5. The base station of claim 4, wherein the X2 interface module transmits information regarding the selected muted subframes by transmitting the updated ABS pattern.

6. A method, comprising:
transmitting a request to one or more first base stations for reporting a number of victim user equipments (UEs);
storing one or more reports indicative of the number of victim UEs;
selecting subframes to mute based on the number of victim UEs;
transmitting information regarding the selected muted subframes to one or more second base stations;
determining a ratio of a number of common victim UEs versus the number of victim UEs; and
transmitting a request for adjusting subframes when the ratio exceeds a threshold.

7. The method of claim 6, wherein the selecting subframes to mute comprises selecting an ABS pattern from a plurality of ABS patterns based on the one or more reports.

8. The method of claim 6, further comprising:
receiving information regarding subframes to mute; and
selecting subframes to mute according to the information regarding subframes to mute.

9. The method of claim 8, wherein the receiving information regarding subframes to mute comprises receiving an updated ABS pattern, and wherein the selecting subframes to mute comprises selecting the updated ABS pattern from a plurality of ABS patterns.

10. The method of claim 9, wherein the transmitting information regarding the selected muted subframes comprises transmitting the updated ABS pattern.

11. A base station, comprising:
an X2 interface module that transmits a request for a report of the number of victim user equipments (UEs) to a first base station;
a memory configured to store the report of the number of victim UEs;
an almost blank subframe (ABS) configuration module that selects initial subframes to mute based on a report of a number of victim UEs;
wherein the ABS configuration module selects the initial subframes to mute by selecting an ABS pattern from a plurality of ABS patterns based on the one or more reports.

12. The base station of claim 11, wherein the ABS configuration module selects the ABS pattern based on a ratio of an average number of victim UEs and a sum of a number of UEs associated with the base station and the average number of victim UEs.

13. The base station of claim 12, wherein the ratio further comprises a system parameter for throughput balance for the average number of victim UEs and the number of UEs associated with the base station.

14. A method, comprising:
transmitting a request to one or more first base stations for reporting a number of victim user equipments (UEs);
storing one or more reports indicative of the number of victim UEs;
selecting subframes to mute based on the number of victim UEs; and
transmitting information regarding the selected muted subframes to one or more second base stations; and
transmitting a request for adjusting subframes upon receiving a request for ABS adjustment.

15. The method of claim 14, wherein the selecting subframes to mute comprises selecting an ABS pattern from a plurality of ABS patterns based on the one or more reports.

16. The method of claim 14, further comprising:
determining a ratio of a number of common victim UEs versus the number of victim UEs; and
transmitting the request for adjusting subframes when the ratio exceeds a threshold.

17. The method of claim 14, further comprising:
receiving information regarding subframes to mute; and
selecting subframes to mute according to the information regarding subframes to mute.

18. The method of claim 17, wherein the receiving information regarding subframes to mute comprises receiving an updated ABS pattern, and wherein the selecting subframes to mute comprises selecting the updated ABS pattern from a plurality of ABS patterns.

19. The method of claim 18, wherein the transmitting information regarding the selected muted subframes comprises transmitting the updated ABS pattern.

* * * * *